US012786368B2

(12) United States Patent
Goto

(10) Patent No.: US 12,786,368 B2
(45) Date of Patent: Nov. 3, 2026

(54) THREE-DIMENSIONAL ANNOTATION RENDERING SYSTEM

(71) Applicant: Tokio Goto, Kobe (JP)

(72) Inventor: Tokio Goto, Kobe (JP)

( * ) Notice: Subject to any disclaimer, the term of this patent is extended or adjusted under 35 U.S.C. 154(b) by 424 days.

(21) Appl. No.: 18/258,459

(22) PCT Filed: Dec. 14, 2021

(86) PCT No.: PCT/JP2021/046048
§ 371 (c)(1),
(2) Date: Jun. 20, 2023

(87) PCT Pub. No.: WO2022/138327
PCT Pub. Date: Jun. 30, 2022

(65) Prior Publication Data

US 2024/0187560 A1 Jun. 6, 2024

(30) Foreign Application Priority Data

Dec. 25, 2020 (JP) ................................ 2020-216517

(51) Int. Cl.
*H04N 13/239* (2018.01)
*G06T 7/593* (2017.01)
(Continued)

(52) U.S. Cl.
CPC ........... *H04N 13/239* (2018.05); *G06T 7/593* (2017.01); *G06V 20/70* (2022.01); *H04N 13/156* (2018.05); *H04N 2013/0081* (2013.01)

(58) Field of Classification Search
CPC ............... H04N 13/239; H04N 13/156; H04N 2013/0081; G06T 7/593; G06V 20/70; A61B 34/20
See application file for complete search history.

(56) References Cited

U.S. PATENT DOCUMENTS 8,499,234 B2 7/2013 Sawada et al.
9,047,698 B2 6/2015 Maciocci et al.
(Continued)

FOREIGN PATENT DOCUMENTS

JP 2008-71298 A 3/2008
JP 2009-512514 A 3/2009
(Continued)

OTHER PUBLICATIONS

Notice of Allowance issued in corresponding Japanese Application No. 2020-216517, dated Apr. 8, 2025 (4 pages).
(Continued)

*Primary Examiner* — John R Wallace
(74) *Attorney, Agent, or Firm* — FLYNN THIEL, P.C.

(57) ABSTRACT

A three-dimensional annotation rendering system includes a calculation device receiving signals captured by right-eye and left-eye cameras, a background image generation unit generating right-eye and left-eye background images, a pointer depth position information generation unit, a pointer longitudinal and lateral position information generation unit, an annotation start/end information generation unit, an annotation-related information storage unit storing depth position information and longitudinal and lateral position information on the pointer from a recording start to a recording end on the annotation, a pointer image generation unit generating right-eye and left-eye pointer images, an annotation-related image generation unit generating right-eye and left-eye annotation-related images, and a background annotation image synthesis unit combining the right-eye and left-eye background images, pointer images, and annotation-related images to generate final right-eye and left-eye images.

4 Claims, 12 Drawing Sheets

(51) Int. Cl.
*G06V 20/70* (2022.01)
*H04N 13/156* (2018.01)
*H04N 13/00* (2018.01)

(56) References Cited

U.S. PATENT DOCUMENTS

| | | | | |
|---|---|---|---|---|
| 9,207,445 | B2 | 12/2015 | Shioda | |
| 9,746,989 | B2 | 8/2017 | Shinoda et al. | |
| 11,026,560 | B2 | 6/2021 | Yamada | |
| 11,197,731 | B2 | 12/2021 | Hoffman et al. | |
| 2015/0258431 | A1 | 9/2015 | Stafford et al. | |
| 2015/0269783 | A1 | 9/2015 | Yun | |
| 2019/0004684 | A1 | 1/2019 | Pahud et al. | |
| 2019/0347865 | A1* | 11/2019 | Hackett | G06T 13/20 |
| 2020/0098194 | A1 | 3/2020 | Jones et al. | |
| 2021/0283496 | A1* | 9/2021 | Mandella | H04N 23/60 |
| 2022/0385878 | A1 | 12/2022 | Iwaki | |

FOREIGN PATENT DOCUMENTS

| | | | | |
|---|---|---|---|---|
| JP | 2009-145883 | A | 7/2009 | |
| JP | 2011-128977 | A | 6/2011 | |
| JP | 2012-90102 | A | 5/2012 | |
| JP | 2013-101599 | A | 5/2013 | |
| JP | 2014-515854 | A | 7/2014 | |
| JP | 2016-511850 | A | 4/2016 | |
| JP | 2019-154886 | A | 9/2019 | |
| JP | 6716004 | B1 | 7/2020 | |
| WO | 2013/179905 | A1 | 12/2013 | |
| WO | WO-2019217148 | A1 * | 11/2019 | G06F 3/011 |

OTHER PUBLICATIONS

Office Action issued in corresponding Japanese Application No. 2020-216517, dated Jan. 7, 2025 (4 pages).
International Search Report, with English translation, issued in corresponding International Application No. PCT/JP2021/046048, date of mailing Mar. 8, 2022 (7 pages).
Written Opinion of the International Searching Authority issued in corresponding International Application No. PCT/JP2021/046048, date of mailing Mar. 8, 2022 (3 pages).

* cited by examiner (A)

(B)

(A)

(B)

THREE-DIMENSIONAL ANNOTATION RENDERING SYSTEM

TECHNICAL FIELD

The present invention relates to a system, or the like, that renders annotations by hand, or by other means, on images displayed on a monitor.

BACKGROUND ART

Currently, for a technique using surgical assistance robots in a medical setting, a robotic arm equipped with surgical instruments and an endoscope are inserted, and doctors operate the robotic arm while viewing an endoscopic image in an operation box called a surgery console.

Doctors need to move surgical instruments, such as forceps attached to the tip of the robotic arm, back and forth, up and down, and left and right in three-dimensional space within a patient's body. For this reason, the surgical assistance robot uses the endoscope to image the inside of the body as a three-dimensional image, and the image is displayed on a three-dimensional monitor in the operation box, so that the doctors can grasp the space inside the body in a three-dimensional manner (see, for example, Patent Literature 1). As the three-dimensional monitor in a medical setting, a polarization system is typically employed, and the doctors wear three-dimensional polarizing glasses to view stereoscopic images.

CITATION LIST

Patent Literature

PTL 1: Japanese Translation of PCT Patent Application Publication No. 2009-512514

SUMMARY OF INVENTION

Technical Problem

There is a problem that even when doctors themselves, who perform procedures, or related persons in the vicinity, try to add annotations (annotation information such as a marked area highlighting an affected site, or lines along which a surgeon's knife is inserted) to a three-dimensional image with an external input device, it is difficult to accurately point out a portion (such as blood vessels and organs) deep inside the body since the annotations are displayed on a two-dimensional surface (the surface of the display).

In light of such circumstances, an object of the present invention is to provide a system, or the like, capable of rendering annotations with supplemented information on depth.

Solution to Problem

In order to accomplish the above-described object, the present invention relates to a three-dimensional annotation rendering system implemented by a calculation device. The calculation device includes a camera image reception unit configured to receive a right-eye imaging signal of a subject imaged by a right-eye camera and a left-eye imaging signal of the subject imaged by a left-eye camera, a background image generation unit configured to generate a right-eye background image on the basis of the right-eye imaging signal and a left-eye background image on the basis of the left-eye imaging signal, a pointer longitudinal and lateral position information generation unit configured to generate longitudinal and lateral position information on a pointer, on the basis of an operation signal transmitted from an annotation input device for operating the pointer, a pointer depth position information generation unit configured to generate depth position information on the pointer, an annotation start/end information generation unit configured to generate recording start information and recording end information on an annotation, on the basis of the operation signal, an annotation-related information storage unit configured to store depth position information on the pointer during a period from time of generating the recording start information to time of generating the recording end information as depth position information on the annotation and to store longitudinal and lateral position information on the pointer during the period from the time of generating the recording start information to the time of generating the recording end information as longitudinal and lateral position information on the annotation, a pointer image generation unit configured to generate a right-eye pointer image and a left-eye pointer image by referring to at least the longitudinal and lateral position information on the pointer, an annotation-related image generation unit configured to generate a right-eye annotation-related image and a left-eye annotation-related image by referring to the depth position information on the annotation and the longitudinal and lateral position information on the annotation, and a background annotation image synthesis unit configured to combine the right-eye background image, the right-eye pointer image, and the right-eye annotation-related image to generate a right-eye final image, and to combine the left-eye background image, the left-eye pointer image, and the left-eye annotation-related image to generate a left-eye final image.

In relation to the above-described three-dimensional annotation rendering system, the calculation device further includes a left and right image synthesis unit configured to generate a three-dimensional final image by superimposing the right-eye final image and the left-eye final image over each other.

In relation to the above-described three-dimensional annotation rendering system, the pointer depth position information generation unit generates the depth position information on the pointer on the basis of the operation signal signifying depth movement that is transmitted from the annotation input device.

In relation to the above-described three-dimensional annotation rendering system, the calculation device includes a subject depth position information calculation unit configured to calculate depth position information the subject on the basis of the right-eye background image and the left-eye background image, and the pointer depth position information generation unit generates the depth position information on the pointer on the basis of the depth position information on the subject corresponding to the longitudinal and lateral position information on the pointer.

In relation to the above-described three-dimensional annotation rendering system, the pointer image generation unit generates the right-eye pointer image and the left-eye pointer image including a parallax based on the depth position information on the pointer.

Advantageous Effects of Invention

The present invention demonstrates an excellent effect of achieving implementation of recording and rendering of annotations corresponding to a three-dimensional image.

DESCRIPTION OF EMBODIMENTS

Hereinafter, a three-dimensional annotation rendering system according to an embodiment of the present invention will be described with reference to the accompanying drawings. In the present embodiment, a case where the three-dimensional annotation rendering system is used in combination with a surgical assistance robot in a medical setting will be illustrated, but the present invention is not limited to the case. The present invention may be used in combination with production lines in factories or the like.

(Overall Configuration)

Figure 1:
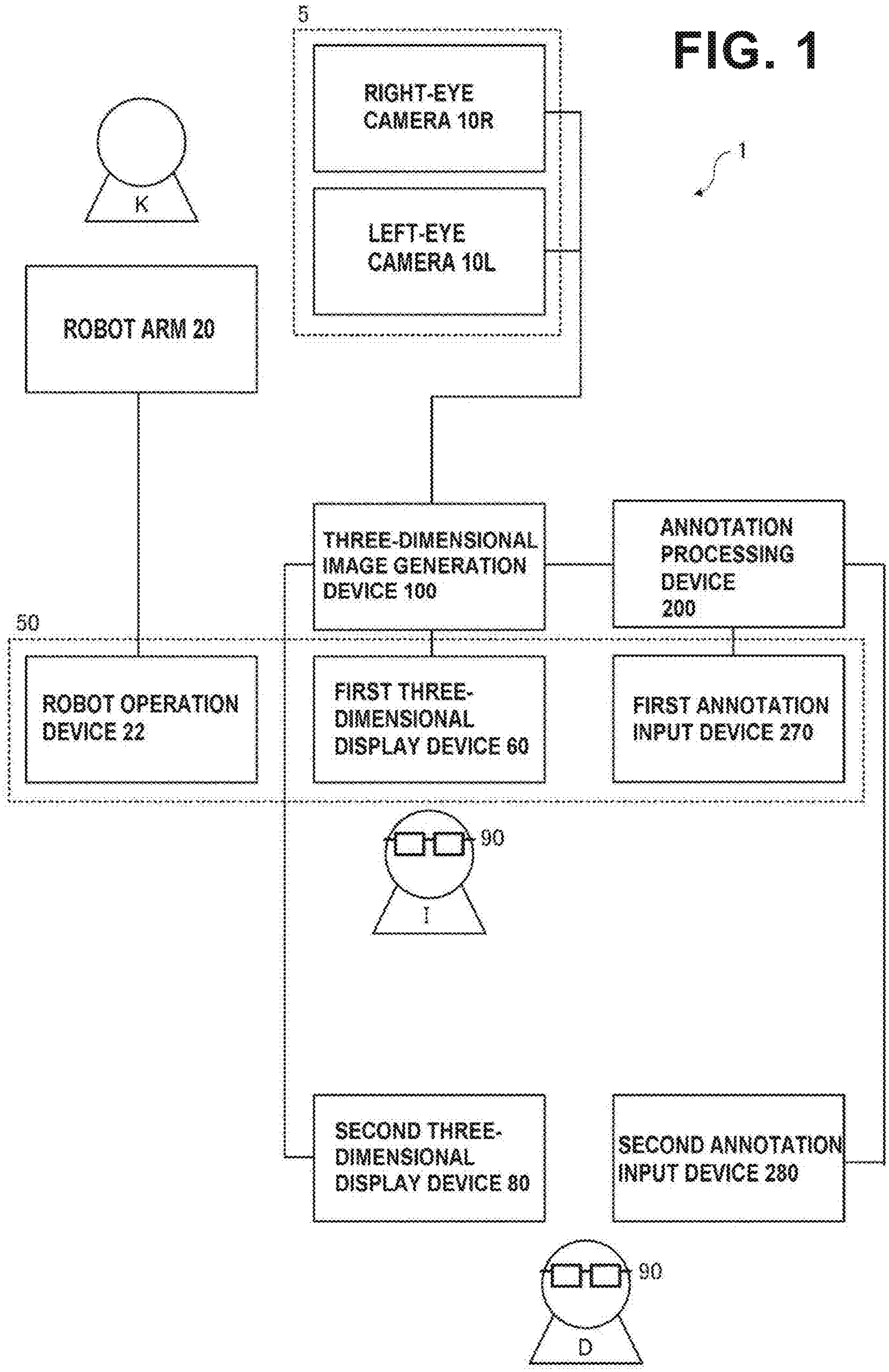
FIG. 1 is a block diagram illustrating the entire configuration of a three-dimensional annotation rendering system according to an embodiment of the present invention.

As illustrated in FIG. 1, a three-dimensional annotation rendering system 1 includes a right-eye camera 10R and a left-eye camera 10L mounted on an endoscope 5 that is inserted into a patient K, a surgical robot arm (robot forceps) 20 that is inserted into the body, a three-dimensional image generation device 100 that receives image input from the right-eye camera 10R and the left-eye camera 10L, a first three-dimensional display device 60 provided in a surgical console 50, a robot operation device 22 provided in the surgical console 50, a first annotation input device 270 provided in the surgical console 50, an annotation processing device 200 that receives operational information input from the first annotation input device 270, a second three-dimensional display device 80 provided outside the surgical console 50, and a second annotation input device 280 provided outside the surgical console 50.

Here, the surgical console 50 is viewed and operated by a doctor I who performs surgical operations. On the other hand, the second three-dimensional display device 80 and the second annotation input device 280 are viewed and operated by a supporter D, such as another doctor that supports the doctor I.

The robot operation device 22 is a so-called master control, which controls the behavior of the robot arm 20 and a medical instrument at the tip of the robot arm 20 when being operated by the doctor I.

The right-eye camera 10R images the inside of the body of the patient K from a viewpoint of the right eye of the doctor I. The left-eye camera 10L images the inside of the body of the patient K from a viewpoint of the left eye of the doctor I. Therefore, a parallax is generated when the right-eye image captured by the right-eye camera 10R and the left-eye image captured by the left-eye camera 10L are compared to each other.

The three-dimensional image generation device 100 is a so-called calculation device, which generates final three-dimensional images (a right-eye image and a left-eye image) by using signals such as a right-eye imaging signal and a left-eye imaging signal imaged by the right-eye camera 10R and the left-eye camera 10L, respectively. Furthermore, this device transmits the three-dimensional images to the first three-dimensional display device 60 and the second three-dimensional display device 80.

The first three-dimensional display device 60 and the second three-dimensional display device 80 are a so-called 3D monitor that displays three-dimensional images. There are various three-dimensional display systems for the 3D monitors, and in the case of a polarization system, for example, a right-eye image and a left-eye image, which are different in a polarization direction (a polarization rotation direction), are displayed in a superimposed manner (this includes both the case where the images themselves are displayed in an overlapped state and the case where the images are alternately arranged in stripe-shape regions or lattice regions so that the images are recognized to be overlapped). With polarizing glasses 90, the doctor I or the supporter D are allowed to recognize only the right-eye image by the right eye and the left-eye image by the left eye. In addition to the polarization system, the 3D monitors may adopt a system in which a right-eye monitor and a left-eye monitor are independently provided as in the case of a head-mounted display (HMD), so that the right eye can recognize the right-eye image on the right-eye monitor and the left eye can recognize the left-eye image on the left-eye monitor. As the 3D monitors, a projector system may also be adopted.

The first annotation input device 270 and the second annotation input device 280 are a so-called mouse-type input device. The doctor I and the supporter D operate the mouse-type input devices to render annotations on the three-dimensional images on the first three-dimensional display device 60 and the second three-dimensional display device 80, while viewing the images. Although the mouse input devices are illustrated as an example here, the present invention is not limited to the example, and various devices, such as a touch pad-type input device, a stylus-type input device, and a stick-type input device, may also be selected.

The annotation processing device 200 is a so-called calculation device, which receives the operational information transmitted from the first annotation input device 270 and the second annotation input device 280, generates and stores annotation-related information, and transmits the annotation-related information to the three-dimensional image generation device 100. Upon reception of the annotation-related information, the three-dimensional image generation device 100 generates three-dimensional images for annotation (a right-eye annotation-related image and a left-eye annotation-related image). The three-dimensional images for annotation are combined with background three-dimensional images (a right-eye background image and a left-eye background image) that are generated from a right-eye imaging signal and a left-eye imaging signal so as to generate the final three-dimensional images.

Figure 2:
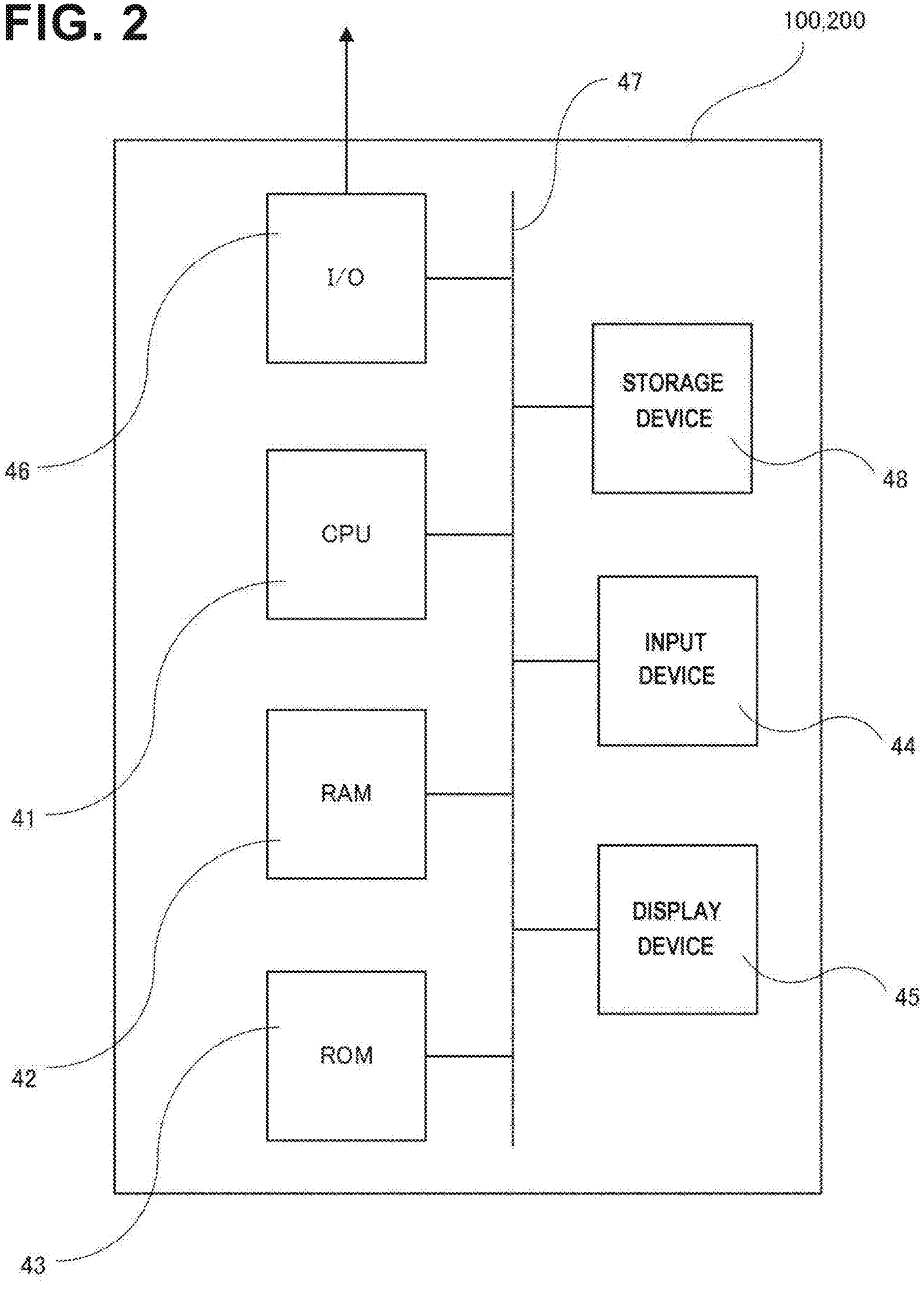
FIG. 2 is a block diagram illustrating a general configuration of a calculation device used in the three-dimensional annotation rendering system.

FIG. 2 illustrates a general-purpose internal configuration of a calculation device 40 that is adopted as the three-dimensional image generation device 100 and the annotation processing device 200. The calculation device 40 includes a CPU 41, a RAM 42, a ROM 43, an input device 44, a display device 45, an input and output interface 46, a bus 47, and a storage device 48. The input device 44 (such as input keys, a keyboard, and a mouse) and the display device 45 (display), which are used for operating the calculation device 40 itself, can be omitted.

The CPU 41 is a so-called central processing unit, which implements various functions of the three-dimensional image generation device 100 and the annotation processing device 200 by executing various programs. The RAM 42 is a so-called random access memory (RAM), which is used as a work area of the CPU 41. The ROM 43 is a so-called read only memory (ROM), which stores a basic OS and various programs (for example, an image generation program for the three-dimensional image generation device 100, and an annotation processing program for the annotation processing device 200) executed by the CPU 41.

The storage device 48 is a hard disk, an SSD memory, a DAT, or the like, which is used for accumulating a large amount of information.

The input/output interface 46 receives and outputs electric power and control signals. The bus 47 is an interconnection that integrally provides connection and communication among the CPU 41, the RAM 42, the ROM 43, the input device 44, the display device 45, the input and output interface 46, the storage device 48, and the like.

When the CPU 41 executes the basic OS and various programs stored in the ROM 43, the calculation device 40 functions as the three-dimensional image generation device 100 or the annotation processing device 200.

(Details of Annotation Input Device and Annotation Processing Device)

Figure 3:
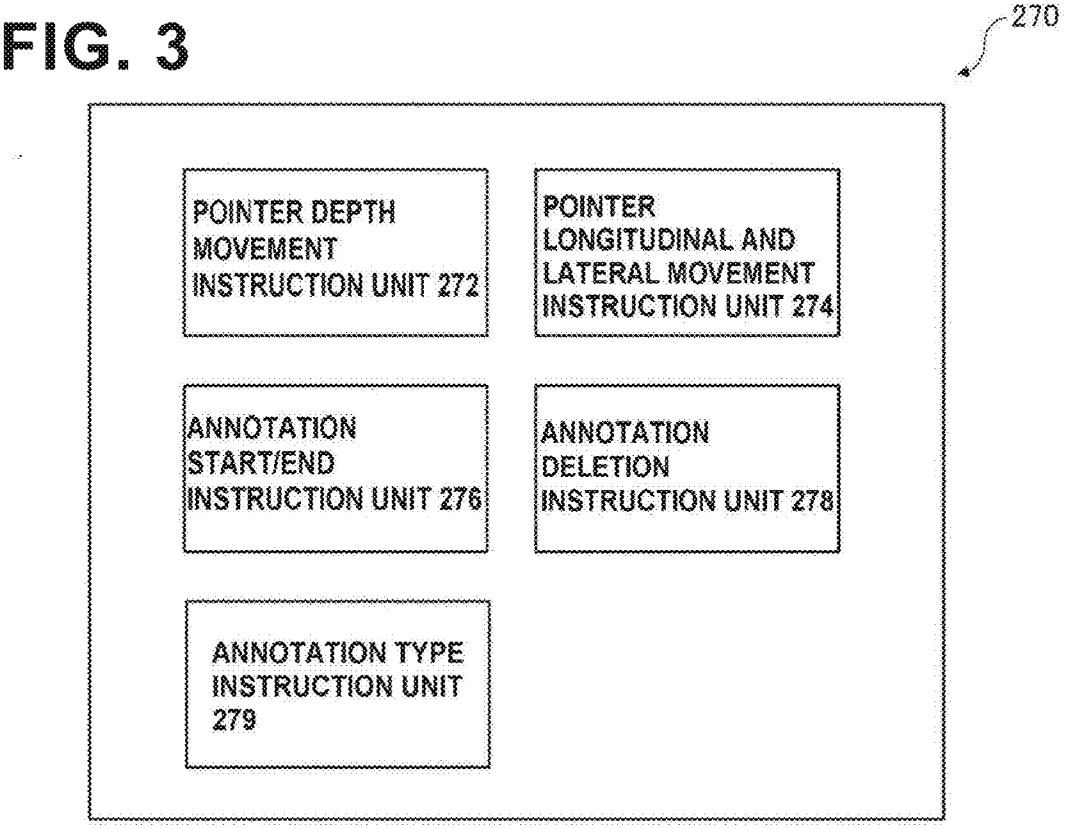
FIG. 3(A) is a block diagram illustrating the functional configuration of an annotation input device used in the three-dimensional annotation rendering system.
FIG. 3(B) is a front view illustrating a case where the functional configuration is implemented with a mouse-type input device.
Figure 3:
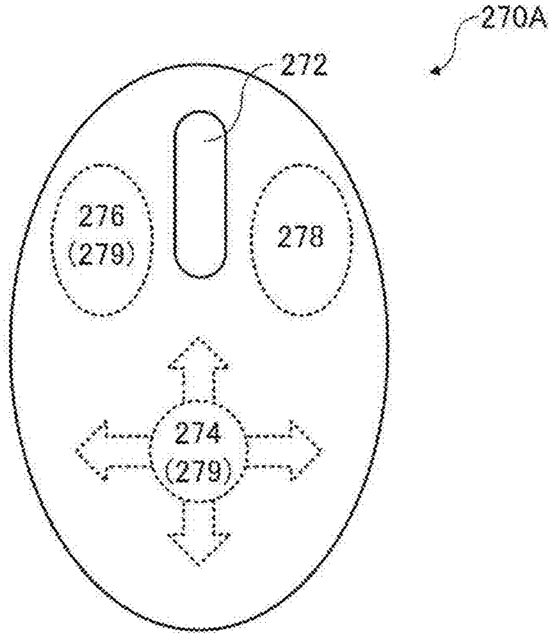

FIG. 3(A) illustrates the functional configuration of the first annotation input device 270. Note that the second annotation input device 280 has the same configuration as the first annotation input device 270, and so the description thereof will be omitted.

The first annotation input device 270 includes a pointer depth movement instruction unit 272, a pointer longitudinal and lateral movement instruction unit 274, an annotation start/end instruction unit 276, an annotation deletion instruction unit 278, and an annotation type instruction unit 279.

FIG. 3(B) illustrates an example where these functions are assigned to a mouse-type input device 270A. For right-hand operation, a left-click area corresponds to the annotation start/end instruction unit 276, a right-click area corresponds to the annotation deletion instruction unit 278, a scroll wheel corresponds to the pointer depth movement instruction unit 272, and a longitudinal and lateral movement detection unit of the device itself corresponds to the pointer longitudinal and lateral movement instruction unit 274. When the scroll wheel is rotated forward, the pointer is moved to a far side, whereas when the scroll wheel is rotated backward, the pointer is moved to a near side. In the present embodiment, the annotation type instruction unit 279 is implemented by using a combination of the left-click area and the longitudinal and lateral movement detection unit. For example, a left-click is performed while the pointer is placed on an annotation type (character, square frame, round frame, straight line, curved line, free line, etc.) that is desired to record, out of a type list 340 (see FIG. 8) displayed on the screen of the first three-dimensional display device 60 or the second three-dimensional display device 80.

Figure 4:
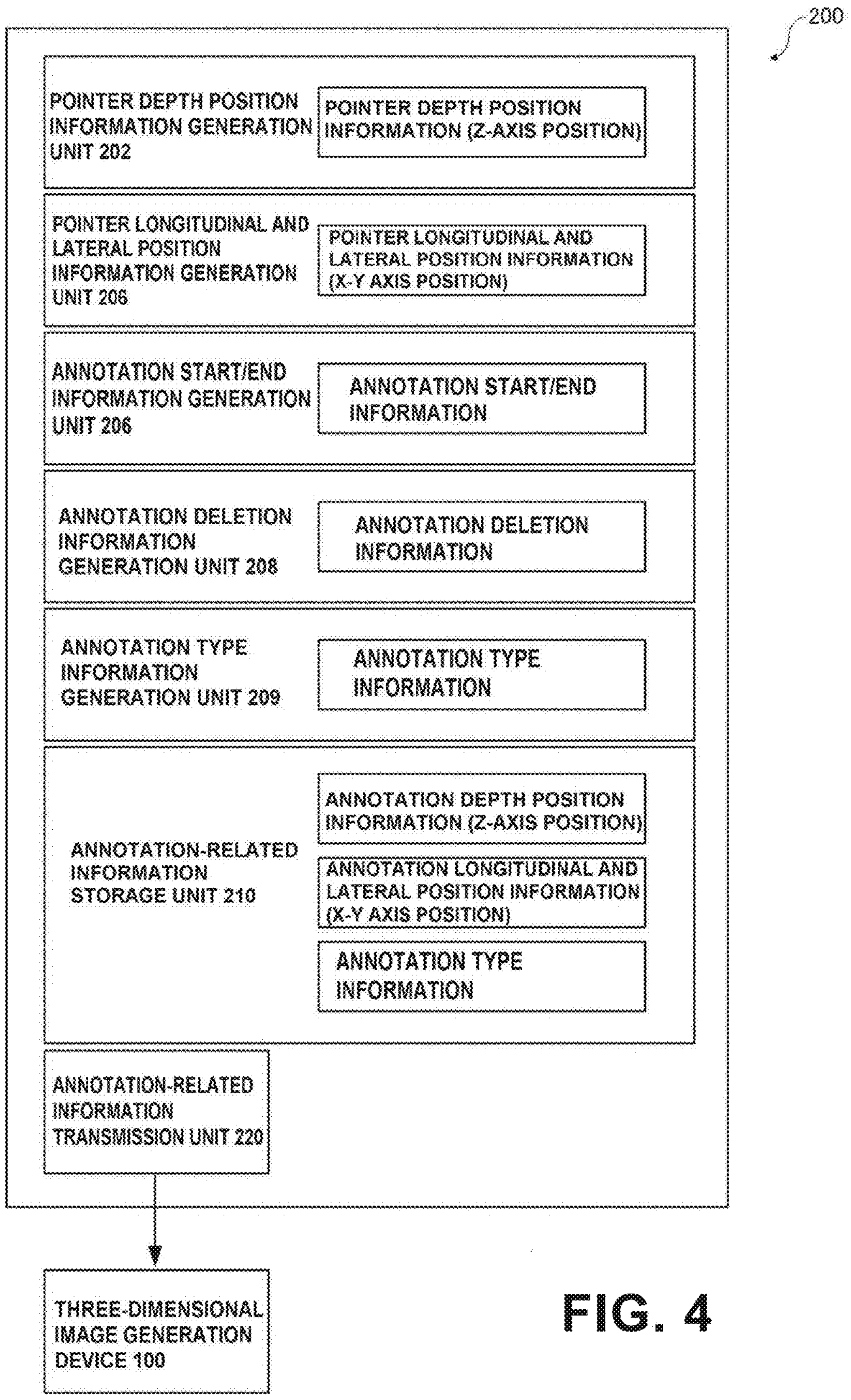
FIG. 4 is a block diagram illustrating the functional configuration of an annotation processing device implemented by a calculation device in the three-dimensional annotation rendering system.

FIG. 4 shows the functional configuration (the program configuration) of the annotation processing device 200. The annotation processing device 200 receives operation signals (a right-click signal, a left-click signal, a scroll wheel signal, a longitudinal and lateral movement signal) transmitted from the annotation input device 270 and also generates and transmits annotation-related information. The annotation processing device 200 includes a pointer depth position information generation unit 202, a pointer longitudinal and lateral position information generation unit 204, an annotation start/end information generation unit 206, an annotation deletion information generation unit 208, an annotation type information generation unit 209, an annotation-related information storage unit 210, and an annotation-related information transmission unit 220.

Figure 6:
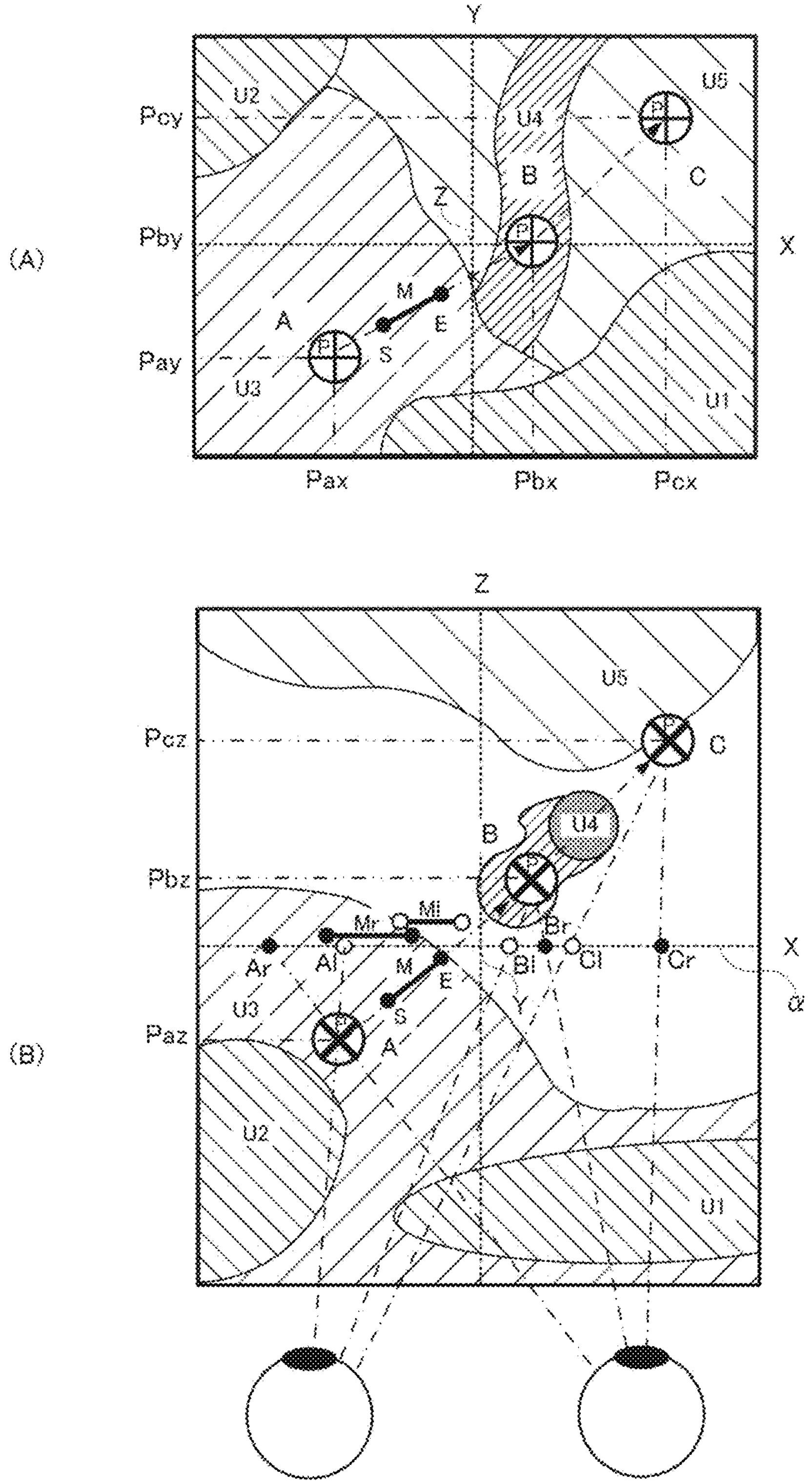
FIGS. 6(A) and 6(B) illustrate a subject (surgical field) in the three-dimensional annotation rendering system, FIG. 6 (A) being a schematic view as viewed from an imaging axis direction of a camera, and FIG. 6(B) being a schematic view as viewed from a direction orthogonal to the imaging axis direction and from above.

With reference to FIG. 6, the relationship between an actual surgical field of the patient K and each of the above-described functions of the first annotation input device 270 and the annotation processing device 200 will be described. FIG. 6(A) shows the surgical field of the patient K as viewed from an optical axis direction of the endoscope 5 (defined here as a Z-axis direction/depth direction), and FIG. 6(B) shows the surgical field as viewed from a direction that is orthogonal to the optical axis and also from a longitudinal direction (defined here as a Y-axis direction). Note that a direction that is orthogonal to the optical axis and is a lateral direction is defined here as an X-axis direction, and a plane formed by the X axis and the Y axis is defined as an X-Y plane.

<Movement of Pointer>

In FIG. 6, it is assumed that the case where a pointer P is moved virtually to a position A, a position B, and a position C, in order. The doctor I rotates forward the scroll wheel, which functions as the pointer depth movement instruction unit 272. Upon reception of this input signal of the movement, the pointer depth position information generation unit 202 generates information (pointer depth position information) for moving the pointer P to coordinates Paz, Pbz, and Pcz, in order, in the depth direction (Z-axis direction). The doctor I also moves the entire mouse-type input device 270A that functions as the pointer longitudinal and lateral movement instruction unit 274. Upon reception of this input signal of the movement, the pointer longitudinal and lateral position information generation unit 204 generates information (pointer longitudinal and lateral position information) for moving the pointer P to coordinates (Pax, Pay), (Pbx, Pby), and (Pcx, Pcy), in order, in X-Y plane directions. As a result of combining the pointer depth position information and the pointer longitudinal and lateral position information, the pointer P moves to the position A, the position B, and the position C, in order.

<Annotation Recording>

When the doctor I operates the annotation type instruction unit 279, the annotation type information generation unit 209 receives a signal of the operation, and generates an annotation type signal. For example, the type list 340 (see FIG. 8), above the image, displays a selection region that has the desired annotation type to record (character, square frame, round frame, straight line, curve, free line, etc.) to be recorded, and when a left-click is performed while the pointer is placed on the "straight line", an annotation type signal is generated, signifying that a straight line is to be drawn.

Figure 7:
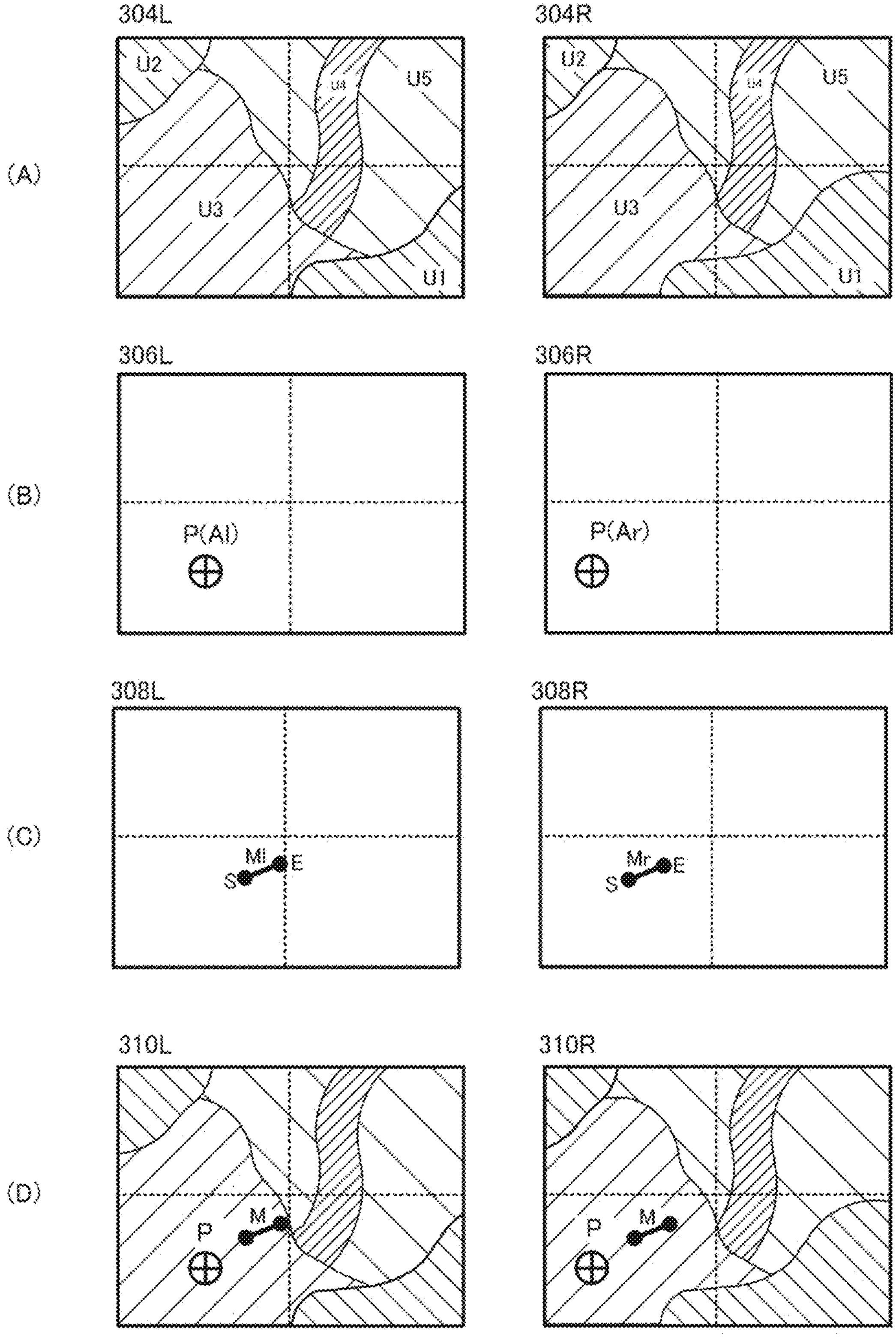
FIG. 7(A) shows a right-eye background image and a left-eye background image generated by the three-dimensional annotation rendering system.
FIG. 7(B) shows a right-eye pointer image and a left-eye pointer image generated by the same.
FIG. 7(C) shows a right-eye annotation-related image and a left-eye annotation-related image generated by the same.
FIG. 7(D) shows a right-eye final image and a left-eye final image generated by the same.

When the doctor I operates the annotation start/end instruction unit 276, the annotation start/end information generation unit 206 receives a signal of the operation, and generates an annotation recording start signal and an annotation recording end signal. For example, when a left-click is performed with the mouse-type input device 270A, a recording start signal is generated, and when the left-click is released, a recording end signal is generated. As a result, while the left-click is held down, an annotation along the movement trajectory of the pointer P is recorded. For example, in FIG. 7, a recording start signal S and a recording end signal E are generated while the pointer P is moving from the position A to the position B. Herein, by using a combination of the movement trajectory of the pointer P from when the start signal S is generated to when the end signal E is generated, and the selected annotation type signal, an annotation M is displayed on the first three-dimensional display device 60 and the second three-dimensional display device 80.

Specifically, a series of movement trajectories (the depth position information and the longitudinal and lateral position information) of the pointer P is stored in the annotation-related information storage unit 210, together with the annotation type signal. These trajectories are based on a series of the pointer depth position information and pointer longitudinal and lateral position information from when the start signal S is generated to when the end signal E is generated.

In the present embodiment, the depth position information and the longitudinal and lateral position information on the pointer P, during a period from the start signal S to the end signal E, are defined as annotation depth position information and annotation longitudinal and lateral position information. The annotation depth position information, the annotation longitudinal and lateral position information, and the annotation type information are collectively defined as annotation-related information.

To the three-dimensional image generation device 100, the annotation-related information transmission unit 220 transmits the annotation-related information stored in the annotation-related information storage unit 210. When an annotation is recorded a plurality of times, each set of annotation-related information is sequentially accumulated in the annotation-related information storage unit 210, forming a database. The annotation-related information transmission unit 220 collectively transmits all the annotation-related information, which are accumulated, to the three-dimensional image generation device 100. Upon reception of the annotation-related information, the three-dimensional image generation device 100 implements generation of annotations M.

The annotation-related information transmission unit 220 also transmits to the three-dimensional image generation device 100 the pointer depth position information and the pointer longitudinal and lateral position information on the pointer P (hereinafter, pointer-related information) and concurrently the annotation-related information stored in the annotation-related information storage unit 210. As a result, other than the annotation M, the image of the pointer P is generated by the three-dimensional image generation device 100.

When the doctor I operates the annotation deletion instruction unit 278, the annotation deletion information generation unit 208 receives a signal of the operation, and generates an annotation deletion signal for deleting the annotations M generated in the past. Specifically, the annotation-related information accumulated in the annotation-related information storage unit 210 is deleted, and transmission of the deleted information to the three-dimensional image generation device 100 is stopped.

For example, when the doctor I performs a right click with the mouse-type input device 270A while the pointer P is at a given position, a deletion signal may be generated to delete all the annotations M included in the annotation-related information. It is also possible to generate an annotation deletion signal to delete only a specific annotation M included in the annotation-related information by placing the pointer P onto the specific annotation M and then performing a right-click.

(Three-Dimensional Imaging Device)

Figure 5:
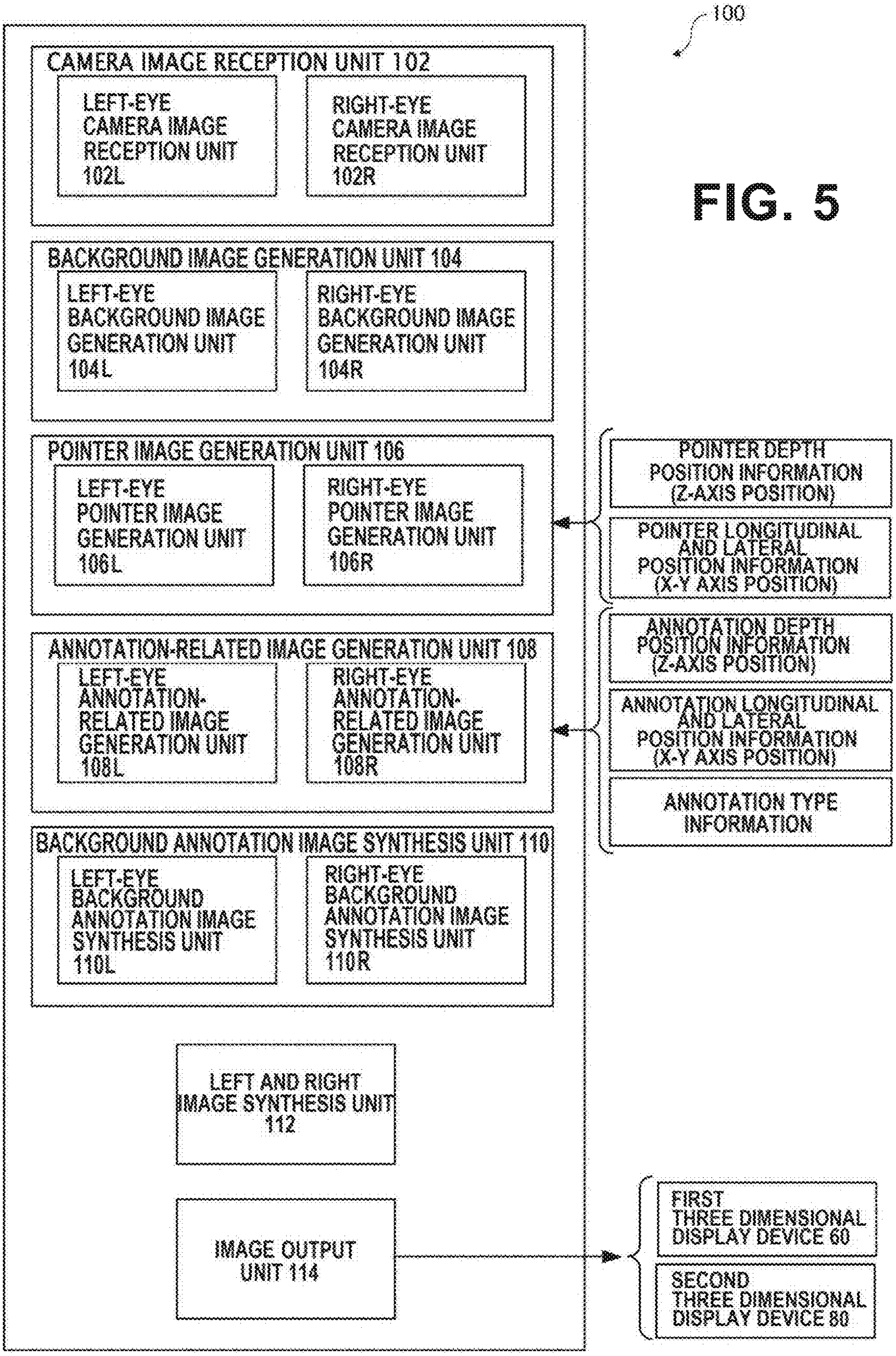
FIG. 5 is a block diagram illustrating the functional configuration of a three-dimensional image generation device implemented by a calculation device in the three-dimensional annotation rendering system.

FIG. 5 illustrates the functional configuration of the three-dimensional image generation device 100. The three-dimensional image generation device 100 includes a camera image reception unit 102 (a right-eye camera image reception unit 102R and a left-eye camera image reception unit 102L), a background image generation unit 104 (a right-eye background image generation unit 104R and a left-eye background image generation unit 104L), a pointer image generation unit 106 (a right-eye pointer image generation unit 106R and a left-eye pointer image generation unit 106L), an annotation-related image generation unit 108 (a right-eye annotation-related image generation unit 108R and a left-eye annotation-related image generation unit 108L), a background annotation image synthesis unit 110 (a right-eye background annotation image synthesis unit 110R and a left-eye background annotation image synthesis unit 110L), and a left and right image synthesis unit 112, and an image output unit 114.

The right-eye camera image reception unit 102R in the camera image reception unit 102 receives a right-eye imaging signal captured by the right-eye camera 10R. Similarly, the left-eye camera image reception unit 102L receives a left-eye imaging signal captured by the left-eye camera 10L.

As illustrated in FIG. 7(A), the right-eye background image generation unit 104R in the background image generation unit 104 generates a right-eye background image 304R using the right-eye imaging signal. Similarly, the left-eye background image generation unit 104L generates a left-eye background image 304L using the left-eye imaging signal. The right-eye background image 304R and the left-eye background image 304L may be the right-eye imaging signal and the left-eye imaging signal themselves, or may be still images or moving images subjected to various image processing to enhance visibility. Naturally, a parallax is generated between the right-eye background image 304R and the left-eye background image 304L. In the present embodiment, a case will be shown in which an organ U1, an organ U2, an organ U3, a blood vessel U4, and an organ U5 are arranged from the near side to the depth side in the Z-axis direction in the surgical field.

As illustrated in FIG. 7(B), the right-eye pointer image generation unit 106R in the pointer image generation unit 106 generates the right-eye pointer image 306R by referring to the pointer-related information received from the annotation processing device 200. Similarly, the left-eye pointer image generation unit 106L generates a left-eye pointer image 306L by referring to the pointer-related information. Specifically, as illustrated in FIG. 6(B), when the pointer-related information (Pax, Pay, Paz) on the pointer P that is present at the position A is received, the right-eye pointer image generation unit 106R calculates, on the basis of a double-sided parallax and a vergence angle specific to humans, a right-eye pointer coordinate Ar when the pointer P is projected on an image reference plane α (for example, an X-Y plane when a Z-axis coordinate is zero or is a reference position) along a right-eye visual axis. Furthermore, this image generation unit inserts an image of the pointer P at the right-eye pointer coordinate Ar in the right-eye pointer image 306R. Similarly, the left-eye pointer image generation unit 106L calculates, on the basis of the double-sided parallax and the vergence angle specific to humans, a left-eye pointer coordinate Al when the pointer P is projected on the image reference plane α along a left-eye visual axis. Furthermore, this image generation unit inserts an image of the pointer P at the left-eye pointer coordinate Al in the left-eye pointer image 306L. As a result, the right-eye pointer image 306R and the left-eye pointer image 306L become pointer images for three-dimensional stereoscopy that take into consideration the effects of the parallax and the vergence angle.

When the pointer P is present at the position B in FIG. 6, the image of the pointer P is inserted at a right-eye pointer coordinate Br in the right-eye pointer image 306R, and the image of the pointer P is inserted at a left-eye pointer coordinate Bl in the left-eye pointer image 306L. When the pointer P is present at the position C in FIG. 6, the image of the pointer P is inserted at a right-eye pointer coordinate Cr in the right-eye pointer image 306R, and the image of the pointer P is inserted at a left-eye pointer coordinate Cl in the left-eye pointer image 306L.

As illustrated in FIG. 7(C), the right-eye annotation-related image generation unit 108R in the annotation-related image generation unit 108 generates a right-eye annotation-related image 308R using the annotation-related information. Similarly, the left-eye annotation-related image generation unit 108L generates a left-eye annotation-related image 308L using the annotation-related information.

Specifically, as illustrated in FIG. 6(B), when receiving annotation-related information corresponding to an annotation M, the right-eye annotation-related image generation unit 108R calculates, on the basis of the double-sided parallax and the vergence angle specific to humans, a right-eye annotation coordinate Mr when an annotation M is projected on the image reference plane α along the right-eye visual axis. Furthermore, the image generation unit inserts an image of the annotation M at the right-eye annotation coordinate Mr in the right-eye annotation-related image 308R. Similarly, the left-eye annotation-related image generation unit 108L calculates, on the basis of the double-sided parallax and the vergence angle specific to humans, a left-eye annotation coordinate Ml when the annotation M is projected on the image reference plane α along the left-eye visual axis. Furthermore, the image generation unit also inserts the image of the annotation M at the left-eye annotation coordinate Ml in the left-eye annotation-related image 308L. As a result, the right-eye annotation-related image 308R and the left-eye annotation-related image 308L become annotation-related images for three-dimensional stereoscopy that take into consideration the effects of the parallax and the vergence angle.

As illustrated in FIG. 7(D), the right-eye background annotation image synthesis unit 110R in the background annotation image synthesis unit 110 superimposes the right-eye background image 304R, the right-eye pointer image 306R, and the right-eye annotation-related image 308R over one another, generating a right-eye final image 310R. Similarly, the left-eye background annotation image synthesis unit 110L superimposes the left-eye background image 304L, the left-eye pointer image 306L, and the left-eye annotation-related image 308L over one another, generating a left-eye final image 310L. In this state, the right-eye final image 310R and the left-eye final image 310L are in a so-called side-by-side format. In the case of a dual-lens display such as a head-mounted display for example, the images may be output from the image output unit 114 as they are and be projected to a right-eye display and a left-eye display.

Figure 8:
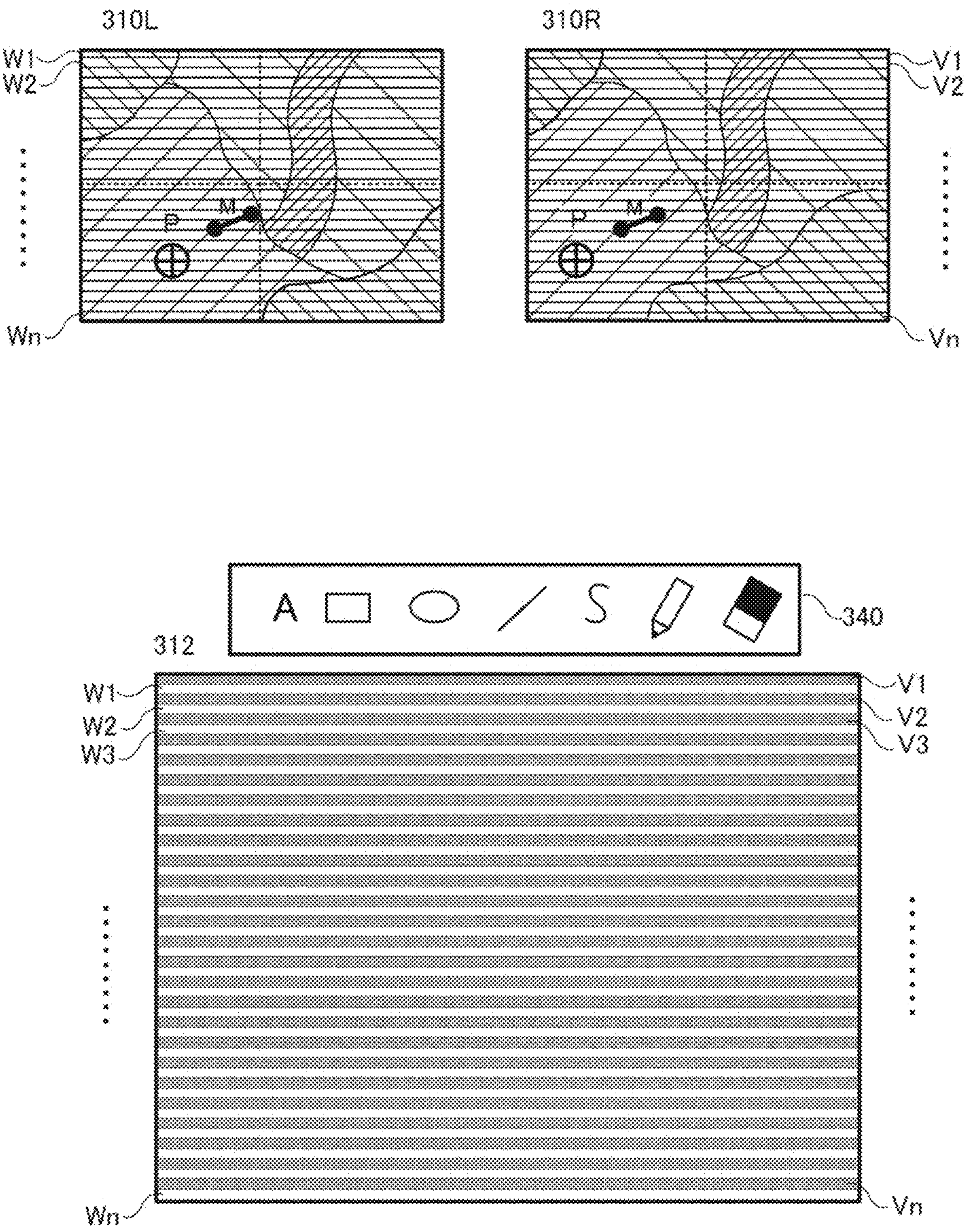
FIG. 8 shows the state of generating a three-dimensional final image by superimposing the right-eye final image and the left-eye final image over each other.

As illustrated in FIG. 8, the left and right image synthesis unit 112 combines the right-eye final image 310R and the left-eye final image 310L to generate a single three-dimensional final image 312. There are many different systems for synthesis. For example, in a case where the first three-dimensional display device 60 and the second three-dimensional display device 80 are monitors of the polarization system, the right-eye final image 310R may be separated into comb-like regions V1, V2 . . . Vn, the left-eye final image 310L may be separated into comb-like regions W1, W2 . . . Wn, and the right-eye comb-like regions V1, V2 . . . Vn and the left-eye comb-like regions W1, W2 . . . Wn may be alternately arranged to generate the single three-dimensional final image 312. The doctor I or the supporter D uses the polarizing glasses 90 to recognize only the right-eye comb-like regions V1, V2 . . . Vn by the right-eye and only the left-eye comb-like regions W1, W2 . . . Wn by the left eye, so that he or she can generate a three-dimensional image in the head. It is preferable to separately add the type list 340 to the three-dimensional final image 312.

The image output unit 114 transmits the three-dimensional final image 312 to the first three-dimensional display device 60 and the second three-dimensional display device 80.

Use Example

A description will now be given of a method of using the three-dimensional annotation rendering system 1 with reference to FIGS. 9 and 10. FIGS. 9(A) and 10(A) schematically show the three-dimensional space (surgical field) recognized on the basis of the three-dimensional final image 312 that is projected on the first three-dimensional display device 60 and the second three-dimensional display device 80 as viewed by the doctor I or the supporter D from the z-axis direction. FIGS. 9(B) and 10(B) schematically show the three-dimensional space as viewed from the Y-axis direction.

Figure 9:
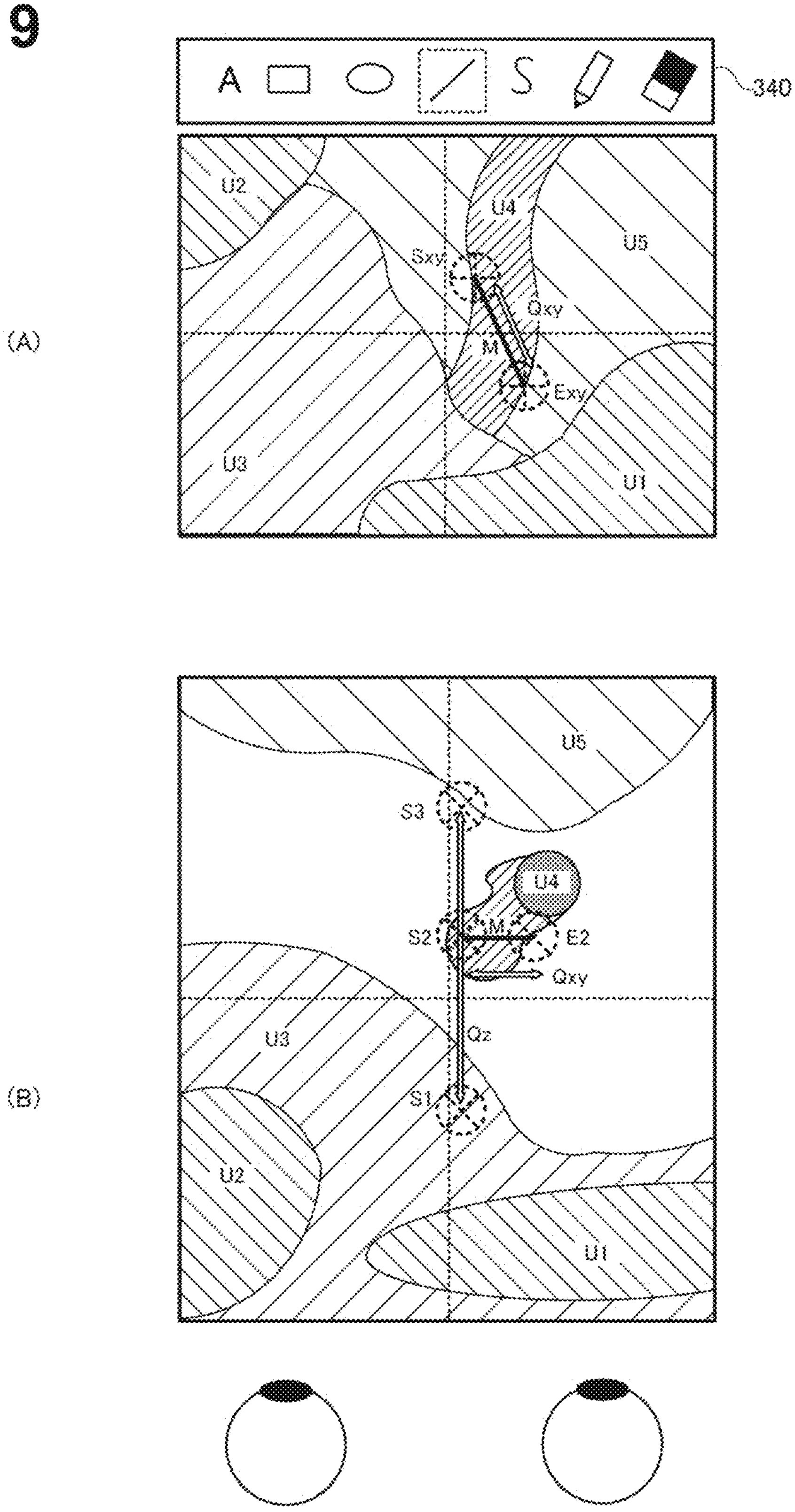
FIG. 9(A) is a schematic view in the three-dimensional annotation rendering system, illustrating a subject as viewed from the imaging axis direction of the camera, the subject being in a three-dimensional state that is recognized by a user.
FIG. 9(B) is a schematic view illustrating the subject in the three-dimensional state as viewed from a direction orthogonal to the imaging axis direction and from above.
Figure 10:
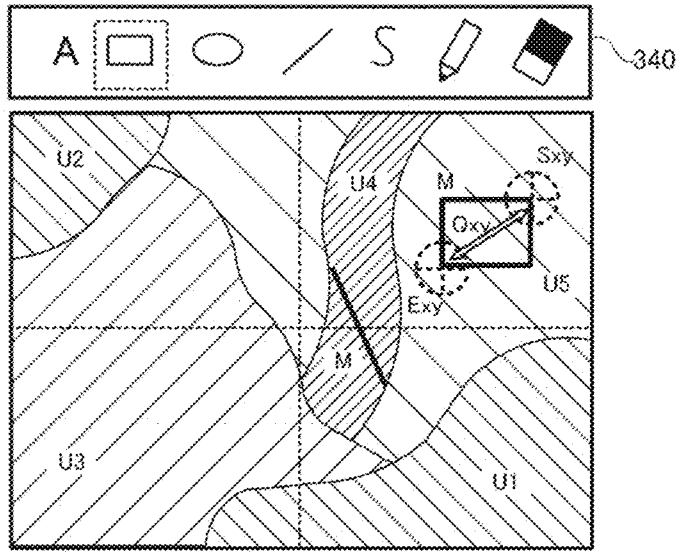
FIG. 10(A) is a schematic view in the three-dimensional annotation rendering system, illustrating the subject as viewed from the imaging axis direction of the camera, the subject being in the three-dimensional state that is recognized by a user.
FIG. 10(B) is a schematic view illustrating the subject in the three-dimensional state as viewed from a direction orthogonal to the imaging axis direction and from above.
Figure 10:
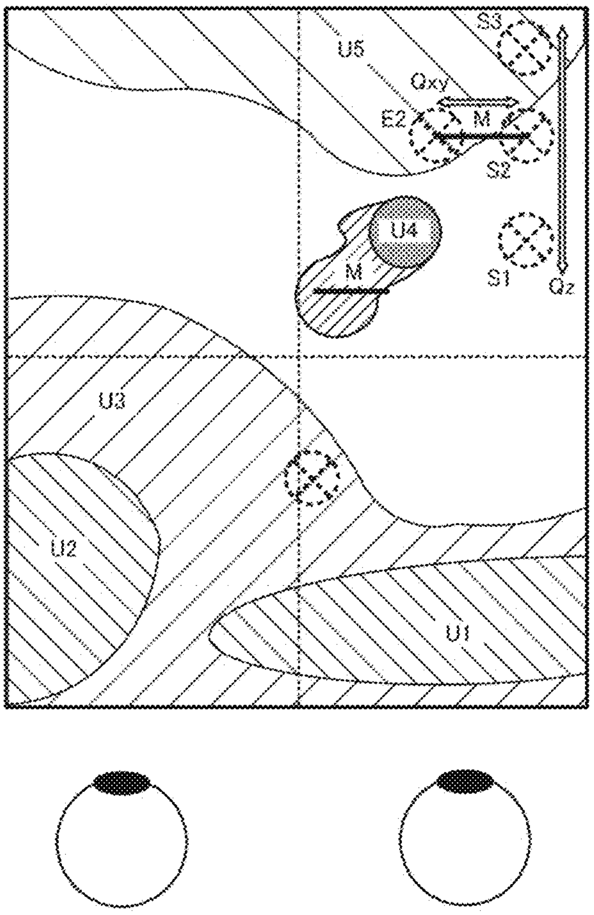

FIG. 9 illustrates a case where a linear annotation is recorded on the surface of the blood vessel U4. First, the doctor I or the supporter D uses the mouse-type input device (the first annotation input device 270 or the second annotation input device 280) to select an annotation type (herein, a straight line) from the type list 340 in FIG. 9(A). Then, in the X-Y plane, the pointer P is placed at an appropriate position Sxy at which recording of an annotation is preferred to take place, this position in other words being the blood vessel U4. Then, the doctor I or the supporter D moves the scroll wheel of the mouse-type input device back and forth so as to move the pointer P along the depth direction (an arrow Sz) in FIG. 9(B) (S1, S2, S3). Since the doctor I or the supporter D stereoscopically recognizes the image of the pointer P in three-dimensional space, the operation of the scroll wheel and the movement of the pointer P in the depth direction are linked. The doctor I or the supporter D stops the scroll wheel at the point when the doctor I or the supporter D can visually confirm that the position S2 of the pointer P in the depth direction matches the position of the blood vessel U4 in the depth direction.

Afterwards, the doctor I or the supporter D places the pointer P again at the correct start position Sxy (S2) where he or she desires to start recording an annotation, and then performs a left-click of the mouse-type input device to input an annotation recording start instruction. In this state, the doctor I or the supporter D moves the mouse-type input device to an end position Exy (E2) and then releases the left click so as to input an annotation recording end instruction. As a result, a linear annotation M is recorded on the surface of the blood vessel U4 in three-dimensional space. The annotation M is constantly displayed as long as the relevant annotation-related information is stored in the annotation-related information storage unit 210.

Subsequent to recording the annotation M in FIG. 9, a case where a square frame annotation M is recorded on the surface of the organ U5 will be illustrated with reference to FIG. 10. First, the doctor I or the supporter D uses the mouse-type input device to select an annotation type (herein, a square frame) from the type list 340 in FIG. 9(A). Then, in the X-Y plane, the doctor I or the supporter D places the pointer P at an appropriate position Sxy at which he or she desires to start recording an annotation, this position in other words being the organ U5. Then, the doctor I or the supporter D moves the scroll wheel of the mouse-type input device back and forth so as to move the pointer P along the depth direction (an arrow Sz) in FIG. 10(B) (S1, S2, S3). Since the doctor I or the supporter D stereoscopically recognizes the image of the pointer P in three-dimensional space, the operation of the scroll wheel and the movement of the pointer P in the depth direction are linked. The doctor I or the supporter D stops the scroll wheel at the point when he or she can visually confirm that the position S2 of the pointer P in the depth direction matches the position of the organ U5 in the depth direction.

Then, the doctor I or the supporter D places the pointer P again at the correct start position Sxy (S2) where he or she desires to start recording an annotation, and then performs a left-click of the mouse-type input device to input an annotation recording start instruction. In this state, the doctor I or the supporter D moves the mouse-type input device to the end position Exy (E2), and then releases the left click so as to input an annotation recording end instruction. As a result, a square frame annotation M, having the start position Sxy (S2) and the end position Exy (E2) as diagonal apexes, is recorded on the surface of the organ U5 in three-dimensional space.

Figure 11:
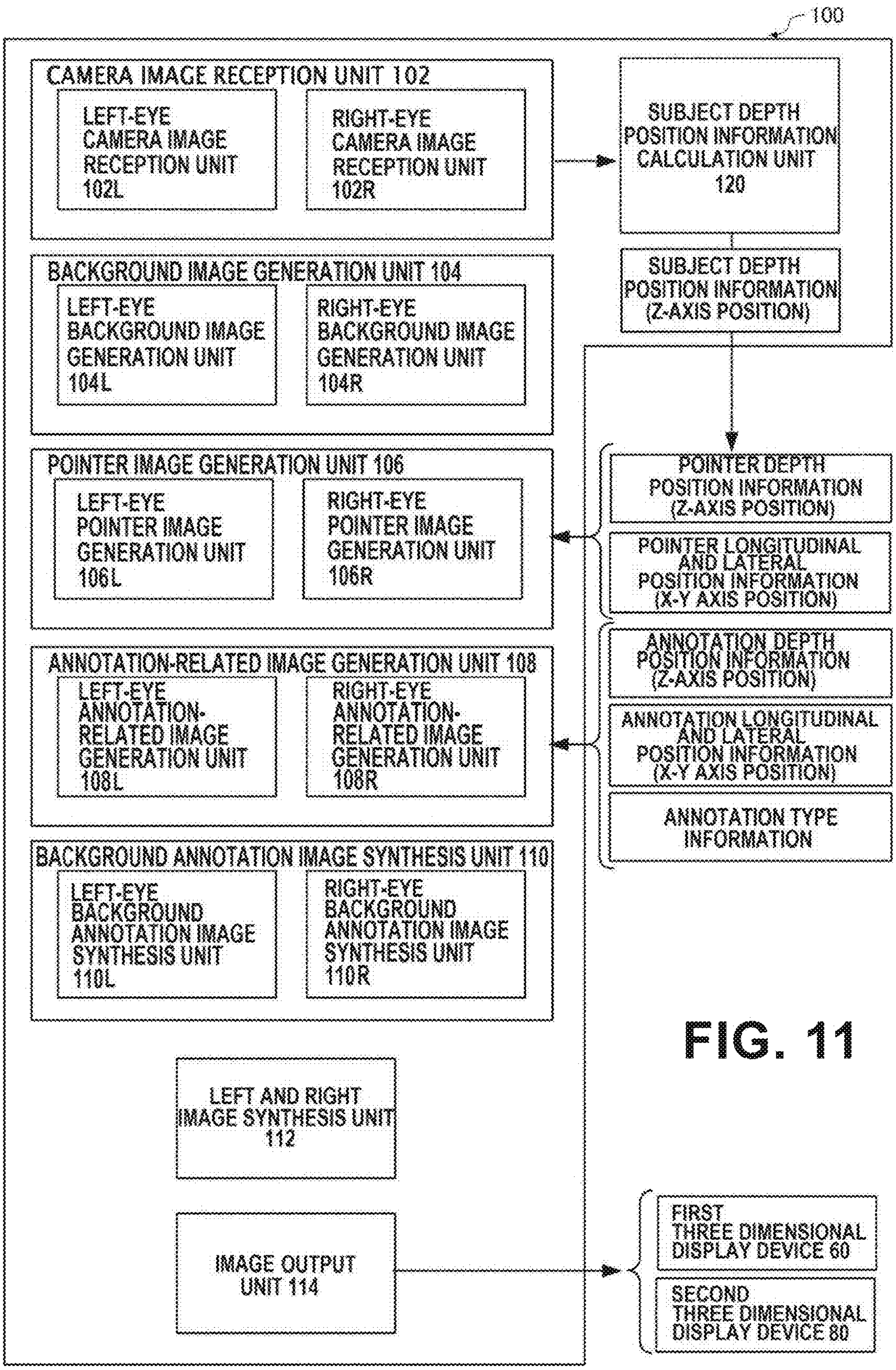
FIG. 11 is a block diagram illustrating the functional configuration of a three-dimensional image generation device in a modification of the three-dimensional annotation rendering system.
Figure 12:
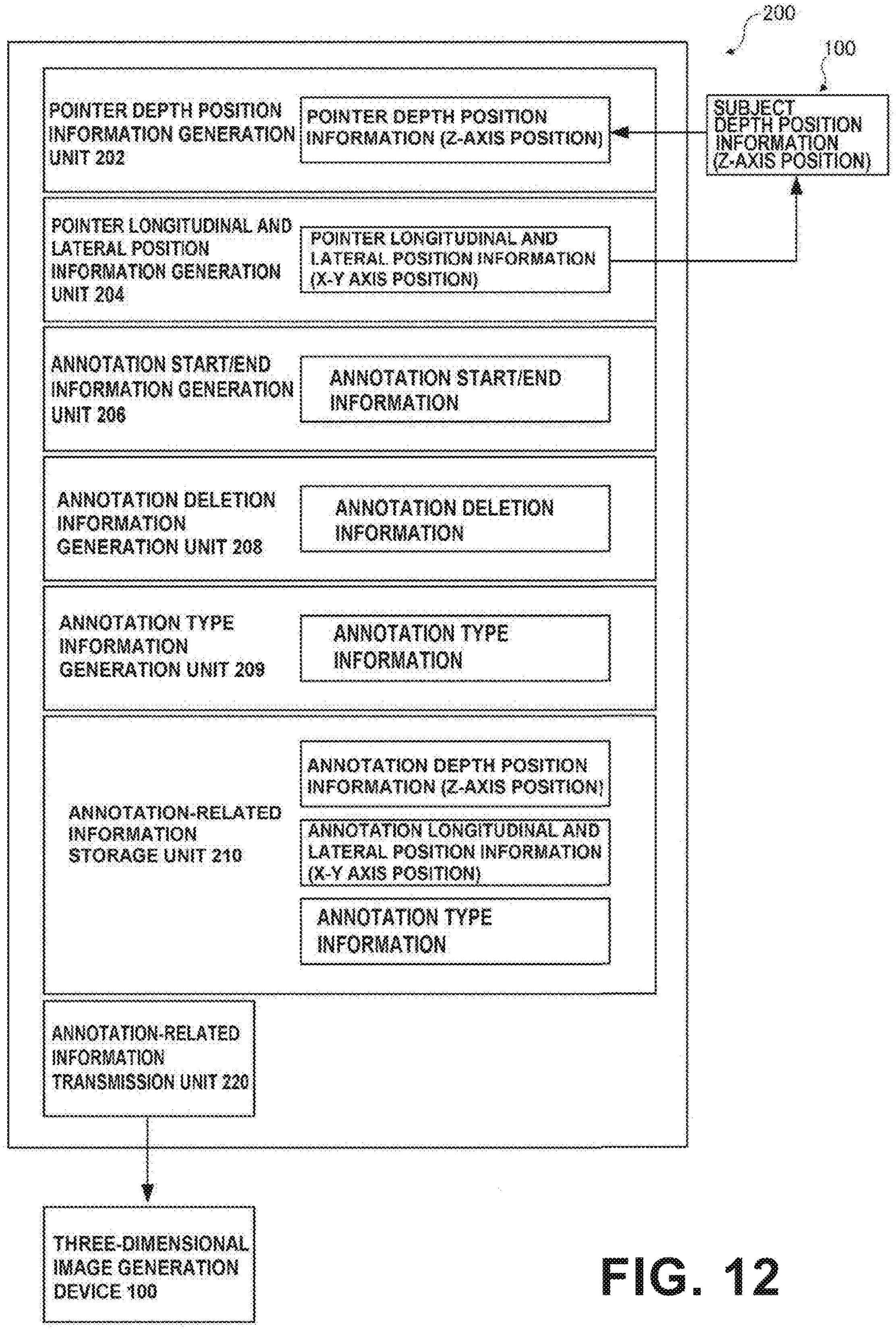
FIG. 12 is a block diagram illustrating the functional configuration of an annotation processing device in a modification of the three-dimensional annotation rendering system.

In the following, with reference to FIGS. 11 and 12, a modification of the three-dimensional image generation device 100 in the three-dimensional annotation rendering system 1 of the present embodiment will be described. As illustrated in FIG. 11, the three-dimensional image generation device 100 as a modification includes a subject depth information calculation unit 120. The subject depth information calculation unit 120 calculates a parallax or the like by performing comparison processing (for example, pattern matching) between signals, such as the right-eye imaging signal captured by the right-eye camera 10R and the left-eye imaging signal captured by the left-eye camera 10L, and calculates depth position information in the Z-axis direction, for all the dots of subjects (an organ U1, an organ U2, an organ U3, a blood vessel U4, and an organ U5) in the X-Y plane. The subject depth position information is referred to when the annotation processing device 200 in FIG. 12 confirms the pointer depth position information.

As a result, when the doctor I or the supporter D simply places the pointer P on the X-Y plane using the pointer longitudinal and lateral movement instruction unit 274 in the first annotation input device 270 and the second annotation input device 280, the annotation processing device 200 can refer to the depth position information on the pointer P at the X-Y coordinate, from the subject depth position information. In other words, the depth position of the pointer P is constantly and automatically adjusted in such a way that the surface, on the near side, of the subject is traced.

Furthermore, when the function of automatically adjusting the depth of the pointer P is provided, the pointer P projected in the final image does not need to be made into a three-dimensional image, and may be a two-dimensional image instead. The annotation display can be visualized alone in three dimensions.

It will be understood that the present invention is not limited to the foregoing embodiment, and various changes can be made without departing from the gist of the present invention.

REFERENCE SIGNS LIST

1 three-dimensional annotation rendering system
5 endoscope
10L left-eye camera
10R right-eye camera
20 robot arm
22 robot operation device
40 calculation device
50 surgical console
90 polarizing glasses
100 three-dimensional image generation device
102 camera image reception unit
104 background image generation unit
106 pointer image generation unit
108 annotation-related image generation unit
110 background annotation image synthesis unit
112 left and right image synthesis unit
114 image output unit

200 annotation processing device
202 pointer depth position information generation unit
204 pointer longitudinal and lateral position information generation unit
206 annotation start/end information generation unit
208 annotation deletion information generation unit
209 annotation type information generation unit
210 annotation-related information storage unit
220 annotation-related information transmission unit
270 first annotation input device
270A mouse-type input device
272 pointer depth movement instruction unit
274 pointer longitudinal and lateral movement instruction unit
276 annotation start/end instruction unit
278 annotation deletion instruction unit
279 annotation type instruction unit
I doctor
K patient
M annotation
P pointer
α image reference plane

The invention claimed is:

1. A three-dimensional annotation rendering system for surgical assistance implemented by:

a right-eye camera and a left-eye camera mounted on an endoscope;

a first three-dimensional display device;

a second three-dimensional display device;

an annotation input device for operating a pointer; and a CPU that receives image input from the right-eye camera and the left-eye camera, the CPU performing the functions of:

receiving a right-eye imaging signal of a subject imaged by the right-eye camera and a left-eye imaging signal of the subject imaged by the left-eye camera;

generating a right-eye background image on a basis of the right-eye imaging signal and a left-eye background image on a basis of the left-eye imaging signal;

generating longitudinal and lateral position information on the pointer, on a basis of an operation signal indicating a longitudinal and lateral movement transmitted from the annotation input device;

generating depth position information on the pointer on a basis of an operation signal indicating a depth movement transmitted from the annotation input device; and generating recording start information and recording end information on an annotation in a three-dimensional surgical field on a basis of the longitudinal and lateral position information and the depth position information;

an annotation-related information storage unit configured to store depth position information on the pointer during a period from time of generating the recording start information to time of generating the recording end information as the depth position information on the annotation and to store the longitudinal and lateral position information on the pointer during the period from the time of generating the recording start information to the time of generating the recording end information as the longitudinal and lateral position information on the annotation;

the CPU further performing the functions of:

generating a right-eye pointer image and a left-eye pointer image by referring to at least the longitudinal and lateral position information on the pointer;

generating a right-eye annotation-related image and a left-eye annotation-related image along a movement trajectory of the pointer by referring to the depth position information on the annotation and the longitudinal and lateral position information on the annotation; and combining the right-eye background image, the right-eye pointer image, and the right-eye annotation-related image to generate a right-eye final image, and to combine the left-eye background image, the left-eye pointer image, and the left-eye annotation-related image to generate a left-eye final image; and an image output unit configured to simultaneously transmit the right-eye final image and the left-eye final image to the first three-dimensional display device and the second three-dimensional display device.

2. The three-dimensional annotation rendering system for surgical assistance according to claim 1, wherein the calculation device further comprises a left and right image synthesis unit configured to generate a three-dimensional final image by superimposing the right-eye final image and the left-eye final image over each other.

3. The three-dimensional annotation rendering system for surgical assistance according to claim 1, wherein:

the CPU further performs the functions of: calculating depth position information on the subject on a basis of the right-eye background image and the left-eye background image;

generating the depth position information on the pointer on a basis of the depth position information on the subject corresponding to the longitudinal and lateral position information on the pointer.

4. The three-dimensional annotation rendering system for surgical assistance according to claim 1, the CPU further performing the functions of generating the right-eye pointer image and the left-eye pointer image including a parallax based on the depth position information on the pointer.

* * * * *